A. W. MATHIS.
Horse Hay-Rake.
No. 213,830.        Patented April 1, 1879.
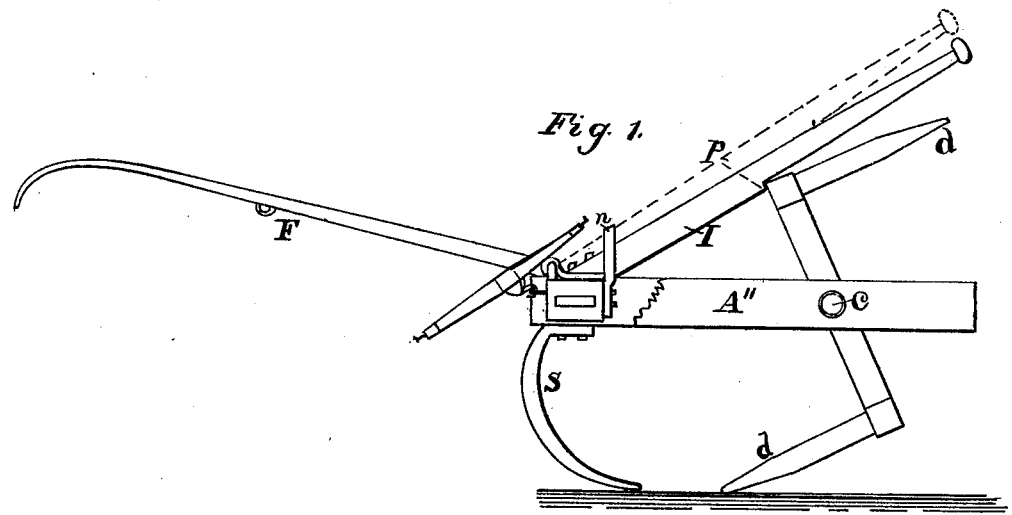
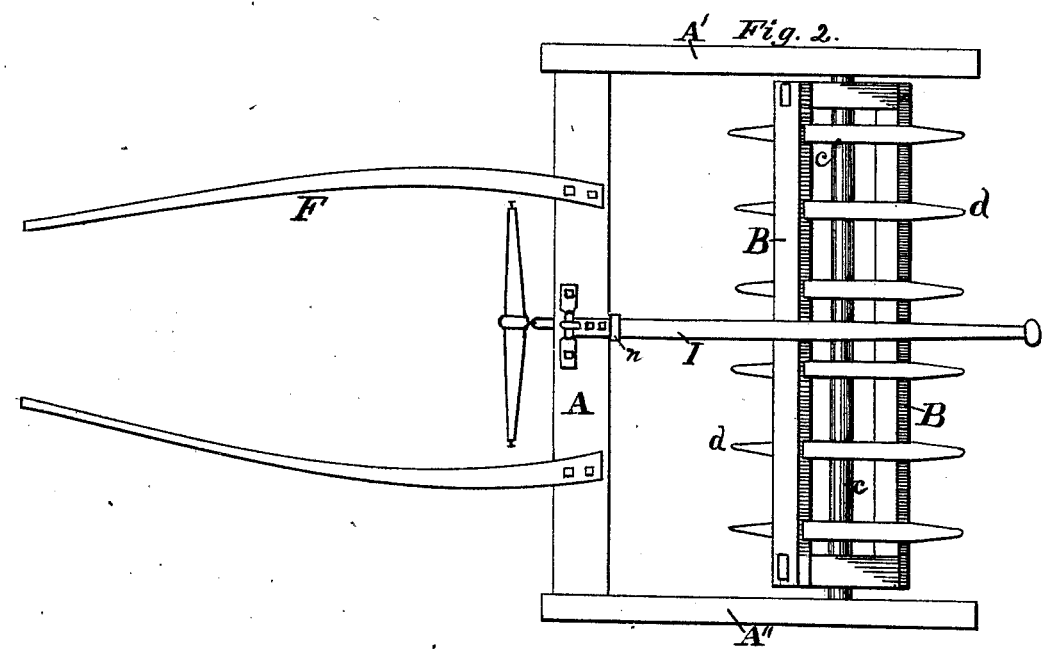
WITNESSES:
J. Morton Gale
A. E. Eader
INVENTOR:
Alfred W. Mathis
By his Atty
Chas. B. Mann

UNITED STATES PATENT OFFICE.

ALFRED W. MATHIS, OF PARIS, TENNESSEE, ASSIGNOR OF ONE-HALF HIS RIGHT TO THOMAS J. BRIZENDINE.

IMPROVEMENT IN HORSE HAY-RAKES.

Specification forming part of Letters Patent No. 213,830, dated April 1, 1879; application filed January 22, 1879.

*To all whom it may concern:*

Be it known that I, ALFRED W. MATHIS, of Paris, in the county of Henry and State of Tennessee, have invented a new and useful Improvement in Horse Hay-Rakes, of which the following is a specification:

My invention relates to a horse hay-rake of that class in which the rake revolves to discharge its load.

The invention will first be described in connection with the drawings, and then pointed out in the claim.

Figure 1 is a side view of the rake. Fig. 2 is a plan view of same.

The letters A A' A" represent the frame in which the rake revolves on the transverse shaft $c$.

The rake consists of a rectangular frame, the longer sides B of which are provided with teeth $d$, arranged as shown, and the short bars or ends are bored to permit the shaft $c$ to pass through, thereby providing means for the rotation of the rake.

The shafts F are rigidly secured to the cross-beam A of the frame, to which, also, the single-tree is attached, by which the rake is drawn.

A lever, I, is hinged to the beam A near the front edge, and has an up-and-down motion, which, however, is restricted by the yoke $n$ passing over the lever, and secured at or near the rear edge of the beam. The lower edge of this lever is provided with a shoulder, $p$, which constitutes a stop against which one of the bars B of the rake-frame abut while the teeth of the other bar are on the ground. When the rake is in operation this lever may be raised to release the bar B from the shoulder and permit the rake to make a partial revolution, the teeth of the bar which was on the ground discharging the accumulated hay, and in turn coming in contact with and stopped by the shoulder $p$ on the lever, the bar which was uppermost in its turn taking position with its teeth on the ground.

By the described arrangement of the yoke, whereby a restriction is placed on the up motion of the lever, the latter is made to serve as a means to lift the rake over obstacles.

A curved metal bar, $s$, is secured by one end to each of the forward corners of the rake-frame on the lower side. The bar is bent in a form similar to a sleigh-runner. The other end, resting on the ground, serves to sustain the rake, and constitutes a spring-runner.

Having described my invention, I desire to secure by Letters Patent of the United States—

In combination with the frame A A' A", the lever I, provided with a shoulder, $p$, and having its vertical motion restricted by the yoke $n$, and the rectangular rake-frame having two sides provided with teeth, as shown and described.

ALFRED W. MATHIS.

Witnesses:
E. W. GROVE,
JNO. D. ADEN.